United States Patent Office 2,735,354
Patented Feb. 21, 1956

2,735,354
METHOD OF TREATING CONTAINERS FOR FOOD

Albert C. Edgar, River Forest, and Hiram T. Spannuth, Chicago, Ill., assignors to Wilson & Co., Inc., a corporation of Delaware No Drawing. Application December 17, 1954, Serial No. 476,056

33 Claims. (Cl. 99—187)

This application is a continuation-in-part application of applicants' prior application, Serial No. 334,962, filed February 3, 1953.

This invention relates to methods for preventing the adhesion of meat and other proteinaceous meaty materials to the inner surfaces of containers therefor. It also relates to can release agents including compositions and coatings for preventing the adhesion of meat and other proteinaceous materials to the inner surfaces of containers.

In the manufacture of canned meats such as luncheon meats, corned beef hash, spiced ham, potted meats, salmon and like proteinaceous meaty materials, the containers, usually metal cans, are filled with the meat, covered, and sealed. These cans are generally made of metal, suitably of sheet iron. Preferably they have been used with the interior surfaces thereof coated with tin and/or lacquer in accordance with standard procedures. After the cans are filled with the meat product they are sealed and the sealed cans are then placed in a steam retort or similar cooker, and cooked, frequently under pressure, for about one to two hours, the amount of pressure and the time of cooking depending on the kind of meat and the size of can used.

A serious problem in the manufacture of canned meats has been the tendency of these products to adhere to the interior surfaces of the cans as a result of the cooking operation. This adhesion of meat to the can not only causes difficulty in effecting a complete removal of the contents of the can, but further results in wastage and inconvenience to the consumer who has to scrape off the adhering meat from the sides and bottom of the container. Furthermore, the appearance of the contents is frequently impaired, particularly with products such as luncheon meats which are to be removed from the can as a formed cohesive unit, because portions of the adhering surface meat are torn away during removal of the meat from the can, leaving an unsightly fragmented product, portions of which are lost to the consumer for the purpose intended.

This tendency of the meat to adhere to the interior surfaces of the can is encountered with all of the usual containers, the interior metallic or other conventional surfaces of the container having been treated or coated with lacquer, tin and the like in accordance with conventional procedures.

One expedient which has not too successfully been used in the industry in the past in combating this problem is to encase the meat in paper, such as parchment paper and the like, before placing the paper-coated meat in the can. This treatment prevents the adhesion of the meat to the walls and bottom of the can, but is objectionable because of the cost in manufacturing and also because it does not receive the approval of consumers who must separate the paper, which is somewhat unsightly, before preparing the product for eating.

Another expedient used in the industry in the past has been the application of a film of melted lard to the inner surfaces of the container or can. It has been found that a film of lard on the inner surfaces of the can has some beneficial effect in reducing the adhesion of meat to the walls and bottom of the can. While the use of lard is regarded favorably because it is a natural edible product and because of its relatively low cost, the results obtained with lard are not uniform and are far from being acceptable due to these and other difficulties for commercial operations. Hence the use of lard as a coating for cans to prevent the adhesion of meat to the interior walls of the can has not been accorded widespread acceptance, either by industry or by the consumer.

The can release agents of the invention prevent the adhesion of proteinaceous meaty materials to the interior walls of the can in which the meaty materials are cooked.

The compositions and compounds which may be used as can release agents in accordance with the invention must be substantially water-insoluble, solid or semi-solid synthetic materials having a melting point above about 155° F., which when deposited in a film on a surface, particularly a metal surface, forms thereon an interface of wax-like character which is preferentially adherent to the surface rather than to the contents of the can at temperatures above about 155° F., and which is non-adherent to proteinaceous meaty materials.

The can release compositions and compounds of the invention are, for all practical purposes, inert, easy and economical to manufacture and withstand, as coatings, the mechanical action of the hot and cold water washing treatments, the filling step and the processing operations in the packing plant.

In a preferred embodiment of the invention, the can release agents, which are inherently adapted to be applied as a thin fused coating or in solution in a volatile solvent on the container stock either before or after it has been formed into a container, are suspended or dissolved in a conventional can coating lacquer or enamel, applied to the container or container stock. Such lacquer or enamel may already have been used to prepare the container before packing and the can release agent applied thereover as a coating, by conventional coating procedures such as spraying, swabbing, dipping, fusion coating etc., but compounds and mixtures of compounds having melting points below 155° F., as pointed out below, when incorporated into the lacquer or enamel which is applied as the usual coating, surprisingly fulfill the requirement that the can release agent adhere preferentially to the container surface rather than to the proteinaceous material during and after the usual packing operations so that effectively these lacquer compositions contain no components which would adhere to the proteinaceous material.

The can release agents of the invention are not limited in their application to proteinaceous meaty materials such as animal protein, since they can be readily applied with advantage to marine protein materials (fish and fish products), to starchy materials which exhibit the same tendency to adhere to the sides of the container and to many other food products. Nor are the can release agents of the invention limited to metal containers or cans, since plastic sheet material, plastic containers, glass, paper and similar wrapping materials may be coated or covered to effectively overcome the tendency of the protein food product to adhere to the container or package, which tendency has been heretofore particularly noted after loading the uncooked or partially cooked food product into containers, sealing the containers and processing the containers under high temperature and pressure in the food processing plant even though the separately cooked food product may not cling to the wrapping material in the absence of this processing operation in the container.

The preferred compounds useful as can-release agents non-adherent to proteinaceous meaty materials are amides and imide derivatives of higher fatty acids having at least 10 carbon atoms in the fatty acid acyl group, these compounds having a melting point above about 155° F., preferably above 212° F. These compounds can be mixed in varying amounts to impart their desirable releasing properties to the mixture and to enhance other desirable physical properties of the mixture to meet the requirements encountered during packing operations.

In general, the preferred compounds are semi-solid or solid amides, or cycloimidines, or their derivatives melting above about 155° F., preferably above about 212° F., in which an acyl from a $C_{10}$ to $C_{28}$ acid, or a mixture of such fatty acids, is attached to amine derived nitrogen, of the formula:

in a chain or bridged chain structure, or in which said acyl is modified as acylamino in a cycloimidine structure, bridged or unbridged, of the formula:

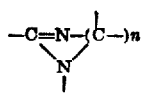

in which cycloimidine structure the intramolecular reaction of the acyl carbonyl —C=O with a primary amino residue of the amine reactant forms a C to N double bond in a

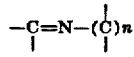

linkage which closes the cycloimidine ring about the —N—C residue of N-acyl.

In other words, the amides and amide derivatives require N-acyl from a $C_{10}$ to $C_{28}$ fatty acid as an essential structural moiety either in a chain structure or as the structural precursor of the cycloimidine ring structure in accordance with the scheme:

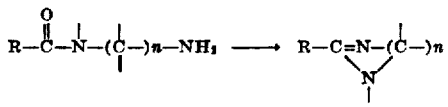

wherein R in each of the above is normal alkyl, preferably saturated, containing from 9 to 28 C. atoms, and $n$ is a whole number greater than 1.

The bridging of chains or cycloimidine rings takes place through reaction with a lower aliphatic aldehyde (formaldehyde, butyraldehyde, glyoxal, or mixtures thereof). In the case of the N-acyl chain structure, the reaction scheme is:

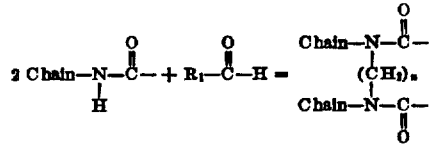

The chains may be the same or different.

In the case of bridging the cycloimidine ring the reaction scheme is:

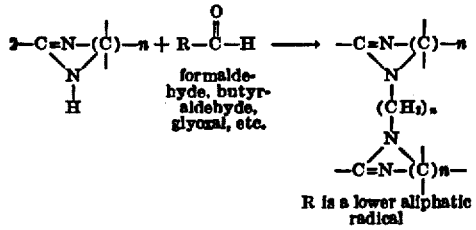

Bridging through the aldehyde condensation may be in both the ring and in the chain where the ring and chain compounds are suitably reacted in proper mixtures with the aldehyde, or in certain instances the aldehyde condensation product may be prepared from an amide containing both the N-acyl amino chain residue and cycloimidine ring residue in the same molecule.

For convenience and to facilitate the understanding of the compound structures of the can release agents in accordance with the invention, they are summarized below, exemplified specifically, and their methods of preparation are given, under the following group headings, it being understood that any one or mixtures may be used:

I. N-acyl chain compounds
II. Bridged N-acyl chain compounds
III. Alkyl cycloimidine compounds
IV. Bridged alkyl cycloimidine compounds
V. Bis cyclo compounds
VI. Aldehyde reaction products of group V

GROUP I—N-ACYL CHAIN COMPOUNDS

The synthetic, high melting point, wax-like materials of the first group are characterized by the presence of an N-acyl group.

The compounds of the first group have at least one normal alkyl group containing from $C_{10}$ to $C_{28}$ attached either to the nitrogen atom or to the carbon atom. The same or different alkyl groups from $C_1$ to $C_{28}$ may be attached to both the nitrogen atom and the carbon atom and/or to other atoms of the compound. Where these amide compounds are formed from a mixture of fatty acids, at least one being a $C_{10}$ to $C_{28}$ normal fatty acid and at least one other being a $C_1$ to $C_9$ normal fatty acid, such as formic, acetic, etc., the compounds are, in general, harder and have higher melting points than the known amide compounds herein referred to.

1($a$). A primary, secondary or tertiary, preferably primary, amide of a long chain aliphatic fatty acid having from 10 to 28 carbon atoms in the molecule. They may suitably be the mixed fatty acid amides derived from hydrogenated and unhydrogenated natural oils and fats such as cottonseed oil, tallow oil and mixtures thereof. Examples are lauramide, myristamide, palmitamide, stearamide, arachidamide, benhanamide, montanamide and methylol derivatives thereof such as stearoyl methylol amide, lauroylmethylol amide, etc.

1($b$). A further example of this class of amides is the compound stearoyl bisamide having the structural formula:

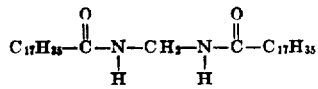

1($c$). A still further example is the reaction product of 2 mols of stearic acid and 1 mol of ethylenediamine having the structural formula:

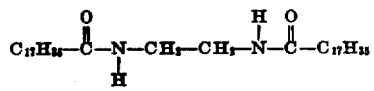

N,N' distearoyl ethylenediamine (ethylene bis-stearamide)

1($d$). A fourth example is the compound

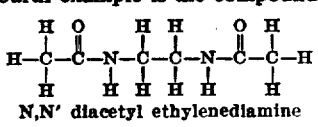

N,N' diacetyl ethylenediamine

1($e$) A fifth example is the compound

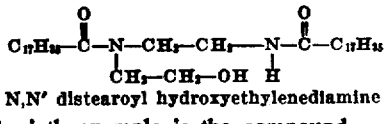

N,N' distearoyl hydroxyethylenediamine

1($f$). A sixth example is the compound

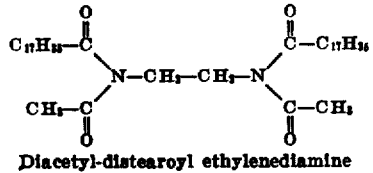

Diacetyl-distearoyl ethylenediamine

2.—*Amides from short chain fatty acids ($C_1$—$C_9$) and normal long chain primary amines containing more than 10 carbon atoms in the amine*

Compounds having the general formula:

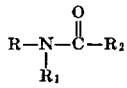

wherein R, $R_1$ and $R_2$ are selected from the group consisting of hydrogen and alkyl and wherein at least one of the R's is a normal alkyl group containing from $C_9$ to $C_{28}$.

Compounds of this type are formed by condensing a primary amine of a normal $C_{10}$ to $C_{28}$ fatty acid with a normal $C_{10}$ to $C_{28}$ fatty acid or a mixture of a normal $C_{10}$ to $C_{28}$ fatty acid and a normal $C_1$ to $C_9$ fatty acid. For example, a compound of this type is formed by condensing the primary amine derived from stearic acid with stearic acid, and splitting off water. Or a compound of this type may be formed by condensing the primary amine derived from stearic acid with a mixture of stearic acid and glacial acetic acid. Other normal $C_{10}$ and higher fatty acids may be used in lieu of stearic acid and other normal fatty acids having up to and including 9 carbon atoms in the molecule may be used in lieu of the acetic acid.

3.—*Polycarboxylic acid amides from long chain amines containing more than 10 carbon atoms in the amine chain*

Compounds having the general formula:

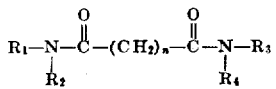

wherein $R_1$, $R_2$, $R_3$ and $R_4$ are selected from the group consisting of hydrogen and alkyl and wherein at least one of the R's is a normal alkyl group containing from $C_9$ to $C_{28}$, and wherein $n$ is a whole number.

Compounds of this type are formed by condensing a di-$C_{10}$ to $C_{28}$ normal amine group with a polycarboxylic acid, preferably a saturated polycarboxylic acid. Examples of such compounds are N, N, N', N' tetraoctadecylsebacamide, N, N, N', N' tetraoctadecyladipamide, and N, N, N', N' tetraoctyldecyl azelamide.

4.—*Aromatic ortho dicarboxylic acid imides of normal aliphatic amines having from 10–29 carbon atoms in the amine*

Compounds having the general formula:

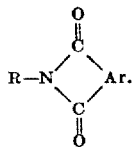

wherein R is a normal alkyl group containing from $C_{10}$ to $C_{29}$ and Ar. is an aromatic group.

An example of a compound falling within this group is N-stearyl phthalimide, formed by reacting monostearyl amine with phthalic anhydride.

5.—*Amides from an aliphatic carboxylic acid and an aromatic amine*

Compounds having the general formula:

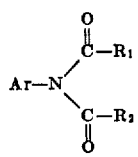

wherein $R_1$ and $R_2$ are selected from the group consisting of hydrogen and alkyl and, wherein at least one of the R's is a normal alkyl group containing from $C_{10}$ to $C_{28}$, and wherein Ar is an aromatic group.

An example of an amide falling within this class of compounds is the compound stearanilide.

6.—*Aliphatic diamides*

Compounds having the general formula:

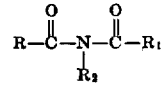

wherein R and $R_1$ are selected from the group consisting of hydrogen and alkyl and wherein at least one of R and $R_1$ is a normal alkyl group containing from $C_9$ to $C_{28}$, and wherein $R_2$ is selected from the group consisting of H and hydroxyalkyl.

In compounds of this type the R and $R_1$ may each have an alkyl group of the same number of carbon atoms or of a different number of carbon atoms, as desired. Examples of compounds falling within this group are stearyl diamide (distearoylamide) and acetyl stearoyl hydroxyethyl diamide (amide).

7.—*Amides from an aromatic carboxylic acid and an aliphatic amine*

Compounds having the general formula:

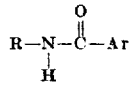

wherein R is a normal alkyl group containing from $C_{10}$ to $C_{28}$ and Ar is an aromatic group, aryl or aralkyl.

An example of an amide falling within this class of compounds is the compound benzyl stearyl amide.

8.—*Amides from an aromatic amine and an aliphatic carboxylic acid*

N-acylated aminobiphenyl compounds, for example, N-stearoyl-o-aminobiphenyl. Compounds of this type are disclosed in United States Patent No. 2,380,043.

9.—*Disproportionate mixed chain fatty acid diamides*

Mixed chain fatty acid diamides having the following formula:

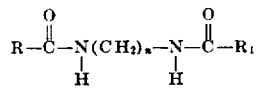

wherein R is a normal alkyl group containing from $C_1$ to $C_8$ carbon atoms, wherein $R_1$ is a normal saturated alkyl group containing from $C_9$ to $C_{28}$, and wherein $n$ is a whole number.

In compounds of this type wherein the mixture of fatty acids from which the compounds are derived, one a long chain, normal fatty acid containing from $C_{10}$ to $C_{28}$ and the other a short chain fatty acid containing from $C_1$ to $C_9$, contains a short chain fatty acid in an amount in excess of one mol, the balance up to 2 mols being the long chain fatty acid, the compounds are characterized by exceptional hardness and have higher melting points than the other amide compounds herein described. For example, by reacting a mixture of 1.1 mols of glacial acetic acid and .9 mol of 90% stearic acid with 1 mol of ethylenediamine, an amide is formed having a melting point of about 300° F. and a Rockwell hardness on the "R" scale of 16. Where similar compounds are formed with equal molar amounts of stearic acid and acetic acid, the Rockwell hardness on the "R" scale of the resulting amide is zero, or less.

In mixed chain fatty acids amides of this type, as the ratio of the mixed fatty acid is changed toward all of the short chain fatty acid, the products are soft and crystalline, approximating the soft, crystalline product obtained by reacting 2 mols of acetic acid with 1 mol of ethylenediamine.

If in the mixture of fatty acids the long chain fatty acid is present in a molar proportion in excess of 1, the balance being the short chain fatty acid, the resulting mixed chain fatty acid diamides also show an improved hardness and relatively higher melting point, although not to the extent where the short chain fatty acid is present in a molar excess with respect to the long chain fatty acid. The improved hardness and higher melting point characteristic is obtained even where in the mixture of fatty acids the short chain fatty acid is present in an amount of 0.1 mol and the loing chain fatty acid is present in an amount of 1.9 mols. Thus, for example, even trace amounts of acetic acid in admixture with stearic acid have an effect in improving the hardness of compounds resulting from the reacting of 2 mols of the mixture of acids with 1 mol of a primary polyamine such as ethylenediamine.

10.—Polyacyl polyalkylene polyamines

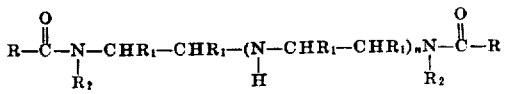

wherein $n$ is an integer and at least 1; R is H or a normal alkyl group; $R_1$ is H or a lower alkyl group containing 1 to 7 carbon atoms; and $R_2$ is H or acyl (fatty acid). An example of a compound of this general formula is N,N' distearoyl tetraethylene pentamine.

In general, with respect to the foregoing synthetic, wax-like amides, the methods of making the same are either known or follow conventional procedures. Thus, for example, amides which may be used in accordance with the present invention may be formed by reacting ammonia with a $C_{10}$ to $C_{29}$ fatty acid to form an ammonium soap which upon heating loses a molecule of water and is converted into an amide. This amide can in turn be reacted with a fatty acid chloride to get the diamide (diacyl amide) and hydrochloric acid; or it can be reacted with formaldehyde or other aldehyde to obtain a fatty acid methylol amide, and with an acid catalyst to obtain a bis-amide with a methylene group between the two amide structures. The amides can also be formed by reacting a $C_{10}$ to $C_{28}$ fatty acid monoamine with a fatty acid (long and/or short chain) to form a solid which loses water on heating to provide the amide. Wax-like amides are also obtained by reacting two mols of stearic acid, for example, with 1 mol of ethylenediamine. In this type of amide the ethylenediamine links the two fatty chains to obtain bis-stearoyl-ethylenediamine. Instead of using stearic acid in this reaction, it is possible to use a mixture of fatty acids, namely, long and/or short chain fatty acids. Other methods of making these synthetic, wax-like amides are known to the art.

GROUP II.—BRIDGED N-ACYL CHAIN COMPOUNDS

11.—Lower aliphatic aldehyde reaction products of the compounds of group I wherein the amide is bridged by an alkylene linkage from the aldehyde

Condensation products of any one or a mixture of the amides of group 1 and a $C_1$ to $C_4$ aliphatic aldehyde such as formaldehyde, butyraldehyde, or a mixture thereof. Formaldehyde is the preferred aldehyde and it may be introduced into the condensation reaction in the form of a gas or a polymer and the reaction carried out as described in United States Patents Nos. 2,393,202 and 2,554,846. The resulting condensation products are N,N'-diacyldiaminoalkanes having the following structural formula:

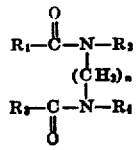

wherein $R_1$, $R_2$, $R_3$ and $R_4$ are selected from the group consisting of hydrogen and alkyl and wherein at least one of the R's is a normal alkyl group containing from $C_{10}$ to $C_{28}$, and wherein $n$ is a whole number.

12.—Bridged polyacyl polyalkylene polyamines

The bridged compounds of the present invention are formed by reacting the unbridged compounds with an aldehyde at an elevated temperature of about 150° to 250° C. The mol proportions of the aldehyde for each 2 mol proportions of the unbridged compound varies with the compound and has the value given for "y" in the structural formula set forth below. Thus, for example, in the case of a di-acid tertraethylene pentamine (an unbridged compound in accordance with the present invention) 5 mols of the aldehyde would be required to bridge 2 mols of the di-acid tetra-ethylene pentamine.

In general the unbridged compounds in the composition are characterized by the following structure:

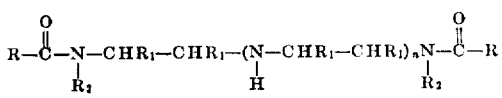

wherein $n$ is an integer and at least 1; R is H or a normal alkyl group; $R_1$ is H or a lower alkyl group containing 1 to 7 carbon atoms; and $R_2$ is H or acyl (fatty acid). By reacting the above structure with an aldehyde, preferably formaldehyde, the following general structure obtains:

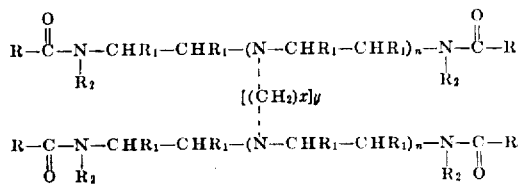

wherein $n$ is an integer and at least 1; R is H or normal alkyl; $R_1$ is H or lower alkyl; $R_2$ is H or acyl (fatty acid); X is a whole number 1 to 4; and $y$ is a whole number from 1 to $n$ plus 2.

GROUP III.—ALKYL CYCLOIMIDINE COMPOUNDS

13.—Products containing the cycloimidine ring

The compounds of the third group are closed ring compounds which are variously referred to as glyoxalidines, imidazolines or cycloimidines having a basic ring structure as follows:

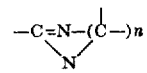

having at least one normal, alkyl group containing from $C_9$ to $C_{28}$, attached to the carbon atom adjacent the double bond and wherein $n$ is a whole number greater than 1.

In general these compounds are obtained by reacting a fatty acid and a polyamine such as ethylenediamine and splitting off water in excess of 1.5 mols for each mol of fatty acid, and under rigorous conditions the full two mols of water split off can be closely approximated. The structural formula for the preferred compounds of this class is as follows:

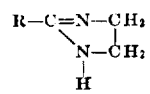

wherein R is from a fatty acid of the $C_{10}$ to $C_{28}$ series, saturated or unsaturated.

In place of ethylenediamine other polyamines can be used. Examples are, propylenediamine, diethylenetriamine, triethylene tetramine, tetraethylenepentamine, dipropylene triamine, etc. Propylenediamine gives the same time structure as immediately above.

The saturated fatty acids give hard solids, the unsaturated fatty acids give stiff greases to resinous materials. They have high melting points.

14.—*Cycloimidine and bridged cycloimidine compounds*

The cycloimidine compounds useful as can release agents are grouped as follows:

*a.* The reaction products of fatty acids $C_{10}$ to $C_{28}$ with an alkylene diamine at temperatures between about 120° and 300° C. to evolve in excess of 1.5 mols of water from the mixture, for each mol of fatty acid. An example of such a product is the reaction product of 1 mol of stearic acid and 1 mol ethylenediamine having the formula:

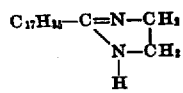

which is a solid melting at about 280° F. Cooled rapidly in a thin film forms a continuous film, firm and hard, which is an excellent can release agent.

*b.* The reaction product of two mols of "*a*" above and 1 mol of an aldehyde such as formaldehyde produces hard wax-like compounds with the splitting off of additional water. Thus, as an example, such a compound is formed by reacting stearic acid with ethylenediamine as in "*a*" above, cooling to just above the freezing point and adding paraformaldehyde, an additional molecule of water being split off. The proportions are two mols of "*a*" above and one mol of formaldehyde. The formula of the product is:

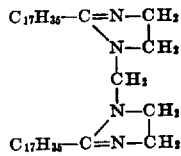

The product is a light colored, hard, wax-like material, whose melting point is about 288° F.

*c.* The reaction products of fatty acids, $C_{10}$ to $C_{28}$, with a polyalkylene polyamine, examples of which are diethylene triamine, triethylene tetramine, tetraethylene pentamine. A mixture of fatty acid and amine in a mol for mol ratio is heated from 120° C. to 300° C., to remove in excess of 1.5 mols of water per mol of fatty acid, and close the cycloimidine ring.

An example of such a product is the reaction product of 1 mol of stearic acid and 1 mol of diethylenetriamine. Two cycloimidine ring formations are observed, the first being through the 1.2 nitrogen, and the second through the 1,3 nitrogen. When the reaction is carried out at atmospheric pressure in an open vessel, the cooled melt is not homogeneous; two fractions appear which can be separated. One fraction is almost white, and crystalline, and melts at about 212° F. This appears to be the 1,2 closure:

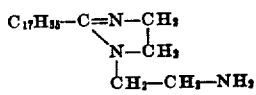

The second fraction is amorphous, off white, and melts at about 194° F. This appears to be the 1,3 closure:

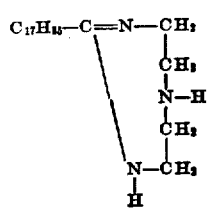

*d.* The reaction products of hydroxyalkylalkylene polyamines of the 1,2 series and at least one member of the group consisting of normal fatty acids of the $C_{10}$ to $C_{28}$ series, amides of said acids, and esters of said acids, at temperatures between about 120° C. and about 300° C., water of reaction being continuously removed from the reaction mixture during the heating, to effect the splitting out of water in excess of 1.5 mols for each mol of free fatty acid, and in excess of 0.5 mol for each mol of combined fatty acid involved.

For example, 1 mol of stearic acid reacted with 1 mol of hydroxyethyl ethylene diamine splits off two mols of water. The structural formula is as follows:

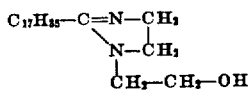

The general formula for these compounds is as follows:

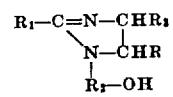

wherein $R_1$ is alkyl containing from 9 to 28 carbon atoms; $R_2$ is alkylene, amino substituted alkylene or oxy-substituted alkylene; and $R_3$ is lower alkyl or hydrogen.

GROUP IV.—BRIDGED ALKYL CYCLOIMIDINE COMPOUNDS

The reaction products of group III "*c*" above with aldehydes, such as formaldehyde introduce an alkylene linkage or bridge. Generally, the melting points of the methylene linked rings are usually very close or slightly higher than the melting point of the ring structure. The melting points of the aldehyde reaction products of "*c*" with either one or two mols of formaldehyde lie between the two fractions, ranging from about 201° F. to 205° F., which indicates that a mixture of 1,2 rings and 1,3 rings is obtained. The melting point with 2 mols of formaldehyde being on the lower side. The four structural formulas are:

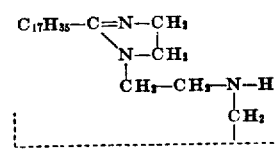

wherein 2 mols of the 1,2 ring are reacted with 1 mol of formaldehyde.

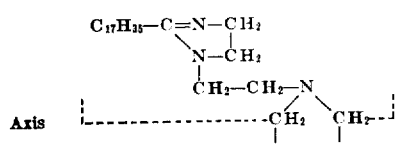

wherein 2 mols of the 1,2 ring are reacted with 2 mols of formaldehyde.

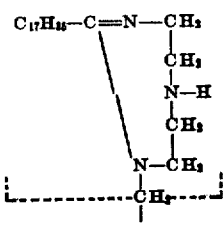

wherein 2 mols of the 1,3 ring are reacted with 1 mol of formaldehyde, and the methylene linkage occurs either at the secondary nitrogen or the tertiary nitrogen, or both.

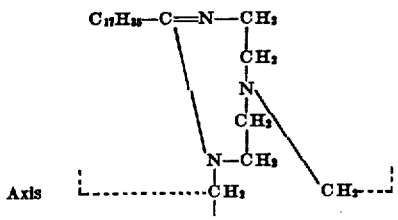

wherein 2 mols of the 1,3 ring are reacted with 2 mols of formaldehyde.

As the number of N's in the polyamines are increased, the reaction products with the fatty acid becomes increasingly complex, and as would be expected various mixtures are encountered. This is not only observed with respect to the reaction of the fatty acid and the polyethylene amine, but also with the further reactions with formaldehyde, wherein the complexity is still further amplified.

The polyfunctional amine structure of triethylene tetramine:

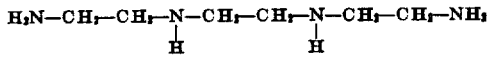

is the basis for the complexity of the derivatives, through the stages of soap, amide-, and ring structure.

In the case of a simple polyamine, ethylenediamine, it is not a difficult task to obtain the bis stearoyl ethylene diamine or the ring structure by proper proportioning of the reactants.

However, as the complexity of the polyamine increases, the preparation is more difficult. In triethylenetetramine it can be observed that either of two or more possibilities exist when 2 mols of fatty acid are reacted with 1 mol of the polyamine. By reacting stearic acid through the terminal nitrogen atoms the N,N' bis-stearoyl triethylenetetramine is obtained. The ring structures are also produced through the ring closure of 1,2 nitrogen and the 3,4 nitrogen. In the first instance 1 mol of water is split off for each mol of fatty acid, in the second instance 2 mols of water are split off for each mol of fatty acid.

But when stearic acid is reacted, 2 mols of fatty acid with 1 mol of ethylenediamine, a stable condition exists after 1 mol of water is removed for each mol of fatty acid, and even prolonged heating at elevated temperatures, on the order of 200° C. results in little change; if anything, decomposition or oxidation sets in. Thus N,N' bis-stearoylethylenediamine is so stable that ring closure is not effected upon heating. However, when 2 mols of stearic acid are heated with 1 mol of triethylenetetramine, as the temperature rises, one mol of water is evolved at 200° C. and more water is progressively lost as the temperature is increased. At 200° C. the product is a light yellow colored wax-like material, melting at about 230° F. As heating progresses, water is given off more slowly.

After a total of 1.5 mols of water are lost the material is darker in color, a little less bright and melts at about 203° F. to 212° F., the melting point being less sharp. In contrast to this, continued heating of the N,N' bis-stearoylethylenediamine at moderate temperatures results in an increase in melting point, due to distillation of unsaturated components which may be present. The ring structure of stearic acid and ethylenediamine generally has a lower melting point than the bis-stearoylethylenediamine. The decrease in melting point is due to the formation of the ring structure.

Larger molecules of wax-like character are obtained when these products are further reacted with formaldehyde to introduce bridges of methylene linkages. Applicants do not wish to limit their process, therefore, to the specific examples and instances set forth in the foregoing, but rather include all of the complexes of wax-like nature and/or suitable melting points for use as can release agents.

GROUP V.—BIS CYCLO COMPOUNDS

These compositions are obtained by reacting normal fatty acids having 10 or more carbon atoms in the chain, with polyalkylene polyamines having at least four nitrogen atoms in the polyamine, and wherein two mols of acid are reacted with one mol of the polyalkylene polyamine at elevated temperatures on the order of 150° to 300° C. until 3 to 4 mols of water are driven off. These products contain the general structure:

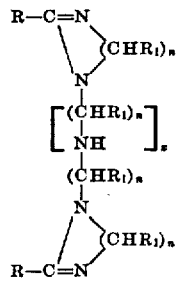

Wherein:

R is a normal alkyl of at least 9 carbon atoms length
$R_1$ is H or lower alkyl
$n$ is a whole number greater than 1
$x$ may be zero or a whole number.

The properties can be radically altered by reacting mixed long and short chain, fatty acids with the desired amine, i. e. $C_1$ to $C_8$ fatty acids in admixture with $C_{10}$ to $C_{28}$ fatty acids, the total mol proportion of acid to amine being constant, and preferably of widely disproportionate lengths, to wit: a $C_1$ fatty acid and a $C_{10}$ fatty acid, or $C_8$ and $C_{18}$, or $C_2$ and $C_{18}$, rather than $C_8$ and $C_{10}$ fatty acids, the mixtures having the greater difference in lengths of carbon chains being preferred, and further mixtures in which the long chain fatty acids predominate are preferred.

GROUP VI.—ALDEHYDE REACTION PRODUCTS OF GROUP V

Complex structures obtained by the reaction of the bis-cycloimidine with aldehyde at temperatures from 150 to 300° C. which may be simple methylol addition products, or complex derivatives of bis-cycloimidines and aldehydes of indeterminate structure.

Examples of bis cycloimidines and their aldehyde reaction products obtained by this procedure effective as can release agents, are:

1. bis cycloimidine from stearic acid and tetraethylene pentamine, melting point 147°–149° F.
2. reaction product of 1 mol of product 1 with 1 mol of formaldehyde, melting point 143°–147° F.
3. bis cycloimidine from stearic acid and triethylene tetramine, melting point 205°–207° F.
4. reaction product of 1 mol of product 3 with 1 mol of formaldehyde, melting point 220° F.

The compounds, compositions and mixtures of the present invention applied as can release films to the container wall for preferential adherence to the container surface rather than to the proteinaceous contents of the can are effective for release of the proteinaceous contents, when applied as a coating, in an amount of as little as 0.2 milligram per square inch of container surfaces.

The amount of material which is applied to the containers may vary from between about 0.2 to 1.0 or more mgs. of material per sq. in. of container surface, depending upon the specific product used and the meat to be packaged. In general, amounts of material in excess of 1.0 mg. per sq. in. tend to be wasteful of the material, but such amounts may be used, if desired. Less than 0.1 mg. of material per sq. in. of container surface will not ordinarily satisfactorily serve as a release agent. From 0.01 gm. to 0.10 gm. of material is usually satisfactory for the coating of an ordinary 12 oz. food can, and a preferred amount for this purpose is 0.02 to 0.05 gm.

When a can release agent product of the character described above is applied as a film uniformly over the interior surfaces of the container, the proteinaceous meaty material packed in the container falls out readily from the container when the same is inverted and there are no patches of particles adhering to the surfaces of the container. In most cases the meat falls out as an unbroken mass, thus presenting an appetizing and pleasing appearance. This was generally not the case with meat removed from cans treated in accordance with prior art procedures.

The can release agents may be incorporated in the conventional lacquer or enamel coatings which may be used for coating of the can stock. An effective amount of the can release agent in the can coating lacquer is from about 4% to about 12% by weight of the lacquer. Larger amounts tend to be wasteful of the material. Smaller amounts than 4% may be effective with certain more efficient can release agents, in the same manner as smaller amounts are effective as fusion coatings, but more uniform results are obtained at a minimum of about 4% (by weight) of agent relative to lacquer.

Better results are generally obtained when the agent is merely suspended, at room temperature, in a solvent dispersion of the conventional lacquer. However, the agent may be added at the end of the cooking and bodying operation during which the lacquer is prepared from the resin, oil and mineral spirits just before the lacquer is cooled. A larger amount (7%–18% by weight) of the agent may be added to the lacquer and heated 5–10 minutes at the lower cooking range 450–550° F. Surprisingly, can release agents melting below 155° F. can be incorporated in the lacquer in these larger amounts to provide an enameled coating of good releasing properties even though the same agents do not provide satisfactory release from the protein when used as fusion coatings.

For example, distearoyl diacetyl tetraethylene pentamine, melting point 138° F., prepared by reacting 2 mols of stearic acid, 2 mols of acetic acid and 1 mol of tetraethylene pentamine, can be incorporated in such larger amounts in a tung oil or tung-linseed medium oil varnish during the holding point and before the varnish is retreated for bodying, to provide beneficial can release properties by virtue of the modification of the properties under these conditions.

As is known, the conventional container enamels for the food stuff industry are based upon pure or modified phenolic resins with tung oil. These are baked on varying time schedules between about 425° F. for 5 minutes to about 275° F. for 30 minutes.

Conventionally used phenolic resins include the heat non-reactive resins formed by reacting p-phenyl phenol, p-cyclohexyl phenol, p-tertiary butyl phenol, p-tertiary amylphenol or like phenol with an aldehyde, preferably formaldehyde, in a mol-to-mol ratio, using an acid catalyst (hydrochloric acid). These resins have softening points varying from 185° to 285° F., and they are cooked to about 400° F. to about 600° F. with a drying or semi-drying oil such as tung oil, oiticica oil, tung-linseed mixtures, tung-soya mixtures, etc. (100 lb. resin to 20–40 gallons of oil), in the presence of an appropriate amount of mineral solvent. After cooking, the varnish may be bodied and driers are added. Lead driers are usually omitted.

Cobalt and manganese driers are preferred in amounts from 0.001% to .005% as metal to oil in the varnish.

The phenolic resins may be modified with rosin, alkyd resins, alkyd-amino combinations, polyamide resins, maleic type resins, etc., as desired. Dehydrated castor oil, bodied linseed oil and other conjugated oils can effectively replace almost all or part of the tung oil. Adhesion to the metal can is not adversely affected by the addition of solvent in an amount up to about 20% of the can release agent if the lacquer is cut with solvent before use.

Example 1 below shows the incorporation of a can release agent in the cold varnish and merely illustrates one of the various procedures set forth above.

The invention and advantages thereof will be readily understood from the following specific examples of illustrative embodiments of the invention. In the examples, the term parts refers to parts by weight unless otherwise specifically indicated.

*Example 1*

100 parts of stearamide and 28 parts of 36% formaldehyde were heated at 248° F. for 1 hour and the temperature was then raised to 329° F., maintained at this temperature for a period of 5 hours, and then cooled. The resulting condensation product had a melting point of 266° F.

The condensation product was powdered to a particle size of approximately 3 microns and 7½% of the powdered product was suspended in a conventional can coating enamel having the following formulation: 100 lbs. phenolic resin, 10 gals. China wood oil, 10 gals. dehydrated castor oil, 40 gals. mineral spirit and 1.6 lbs. 6% manganese naphthenate drier. The suspended material was then applied to tinned iron can stock by means of gelatin glycerine rollers and the coated can stock was baked at 300° F. for a period of 10 minutes.

Twelve 12 oz. cans were prepared from the treated can stock. The cans were washed and sterilized with a mixture of boiling water and steam and then they were filled with chopped beef, sealed with a cover of coated can stock and processed in accordance with conventional procedure for a period of 75 minutes at 230° F. Beef was selected in the packaging of these cans because more trouble is usually encountered with adherence of beef than with other food products. On opening the cans, the meat product fell readily from the can with no adherence to the surfaces of the can.

As a control, similar cans, except that they were not treated with the coating material, were sterilized, packed and processed with chopped beef in the same manner as the coated cans. A second group of control cans, spray-coated with hot lard in accordance with conventional procedures before filling and processing, was also packed and treated in the same manner as the coated cans. Upon opening both the uncoated cans and the lard-coated cans, the meat stuck to the sides of the cans and was difficult to remove.

*Example 2*

The powdered condensation product of Example 1 was suspended in naphtha in a concentration of 25% and was then applied to tinned iron stock by the use of gelatin rollers. The condensation product was fused to the stock at 300° F., driving off the naphtha. The treated stock was then made into 12 oz. luncheon meat cans and the cans were packaged and processed as above described in Example 1. Upon opening, the meat again fell readily from the can without adhering to the sides, top or bottom.

*Example 3*

The procedure in Example 1 was again followed except that the 3-micron powder condensation product was dusted on the sheet stock and then fused thereto before manufacture of the cans. Again, after packaging and processing as described in Example 1, the entire meat content was readily released from the can upon opening and inversion thereof.

Example 4

A ready and complete release of chopped beef was also obtained in cans of bonderized iron coated and packaged and processed as described in connection with Example 1.

Example 5

Aluminum cans were coated with the condensation product and then packaged and processed in accordance with the procedure of Example 1. Ready and complete release was again obtained.

Example 6

113 parts of red oil (commercial oleic acid comprising about 80% oleic acid, 10% of a mixture of palmitic and stearic acids and 10% linoleic acid) and 21.5 parts of formamide were mixed and brought to a temperature of 446° F. and held for 30 minutes. The crude material was crystallized from acetone at 32° F. and then recrystallized. The resultant product was a mixed "oleyl" ("oleoyl") amide having a melting point of 163.4°–167° F.

30 parts of the purified "oleoyl" amide and 9 parts of 38% formaldehyde solution were heated at 248° F. for 1 hour with constant stirring. The temperature was then raised to 329° F., maintained at this temperature for an additional hour and then cooled. The melting point of the resulting condensation product was 219.2°–224.6° F.

The condensation product was powdered and cans were treated with the condensation product and packaged and processed in accordance with the procedure outlined in Example 1. The chopped beef was released readily from the treated cans without adherence to the walls.

Example 7

100 parts of coconut oil acid amides having a melting range of 163.4° F.–179.6° F., 28 parts of 40% formaldehyde solution and 2 parts of concentrated sulfuric acid were mixed together and brought to a temperature of 248° F. This temperature was maintained for a period of 1 hour with constant stirring. The product was then heated for 3 hours at 329° F. and cooled. The resulting condensation product had a melting range of 257°–268° F.

The condensation product was powdered and applied to cans in accordance with the procedure outlined in Example 1 and the treated cans were packaged and processed as in the example. Excellent release of the food product contained in the cans was obtained.

In the above example, the sulfuric acid functions as a catalyst. Sulfuric acid or other suitable catalysts may also be employed in the other examples given and in other amide-aldehyde reactions in accordance with the present invention, if desired. Other suitable catalysts are, for example, hydrochloric acid and phosphoric acid.

Example 8

The reaction of a high fatty acid amide with formaldehyde in the presence of pyridine is illustrated in this example.

Commercial stearamide containing 4.43% of free fatty acid as stearic acid is reacted with an excess of formaldehyde, about 1:1 molar reacting ratio in the presence of a pyridine catalyst as indicated below to recover a carbon tetrachloride insoluble fraction and an alcohol soluble fraction. The latter fraction contains bound reactive aldehyde which upon heating at 250° C. for 1 hour evolves formaldehyde and is likely a bridged methylene derivative of 2 mols of the N methylol stearamide which has a lower degree of oxygenation, and is more stable against the action of high temperature than the starting material. These products are all good can release agents.

The pyridine reaction permits recovery of the N methylol intermediate compound:

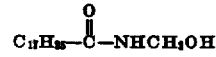

Reactions: Stearamide—means molecular weight 274, free fatty acid (as 274) 4.43%. Paraformaldehyde melting 64° C.

Procedure and results:

| Reactants | Wt. in gms. | Percent by wt. | Wt. in grams of active material | Gram mols | Mols ratio |
|---|---|---|---|---|---|
| Stearamide | 119.7 | 87.0 | 114.4 | 0.42 | 1 |
| Paraformaldehyde | 18.0 | 13.0 | 18.0 | 0.60 | 1.4 |
| Yield—126.5 gms. (Loss due to transfer loss). | | | | | |

Theoretical yield if the N-methylolamide were formed—132.9 gms. (including 5.3 gms. of free fatty acid present in the stearamide).

The amide, paraformaldehyde, 1.3 grams of pyridine and 300 ml. of Skelly Solve B (B. P. 60–70° C.) were refluxed together for 22 hours at 64–66° C. Sealed agitation was applied during the last 4 hours. The mixture was cooled to 20° C. at the end of the reflux period and the solids separated and washed with Skelly Solve B and dried. Considerable quantities of unreacted amide were present, probably due to insufficient agitation of the reactants during the early stages of the reaction. The amide and paraformaldehyde are relatively insoluble in the petroleum ether.

The crude reaction product mixture was labeled V8. Some of the V8 was mixed with carbon tetrachloride at 50° C. and the insoluble portion was collected and dried as V8a. Some more of the V8 was mixed with alcohol at 50° C., filtered, and the filtrate collected and cooled to 20° C. The crystals which separated were collected and dried as product V8b.

The powdered portion of V8 was separated from the solid lumpy material and melted. Upon melting a vigorous reaction ensued with the evolution of a gas and the odor of formaldehyde. Heat was continued for ½ hour at 250° C. until very little gas was being evolved. This product was labeled V8c. It was a solid brittle waxy material, light brown in color. The melting points of these products appear below.

Product: Closed tube M. Pt.
V8 _____°F__ 225–230
V8a _____°F__ 221–228
V8b _____°F__ 228–232
V8c _____°F__ 257–264

The alcohol soluble fraction, V8b, melting point 228–232° F. is the N methylol stearamide of the formula at the beginning of the example.

Example 9

Two mols of stearic acid are reacted with 1 mol of tetraethylene pentamine at 235° C. to form the distearoyl tetraethylene pentamine, melting point 158° F., and then reacted with paraformaldehyde at 150° C., in ratios of 2 mols of distearoyl tetraethylene pentamine, to 1 mol of paraformaldehyde, to provide a monomethylene derivative, melting point 159° F., and in ratios of 2 mols of distearoyl tetraethylene pentamine to 5 mols of paraformaldehyde to obtain pentamethylene bis (distearoyl tetraethylene pentamine), melting point 159° F. All three products are satisfactory can release agents.

Example 10

Following the procedure of Example 9, 2 mols of stearic acid were reacted with diethylene triamine to obtain the distearoyl diethylene triamine, melting point 214° F., and 2 mols of this first product were reacted with 1 and 2 mols respectively of paraformaldehyde to produce monomethylene bis (distearoyl diethylene triamine), melting point 208° F., and dimethylene bis (distearoyl diethylene triamine), melting point 212° F., respectively. All three products are waxy solids, and are good can release agents.

*Example 11*

Distearoyl tetraethylene pentamine, melting point 158° F., the monomethylene derivative thereof melting point 159° F. (reacted with aldehyde 2:1 mol ratio) and the pentamethylene derivative, melting point 159° F. (pentamine to aldehyde, ratio 2 to 5) were powdered to a particle size of about 3 microns. The powdered products were suspended in the following can coating enamels, each in amounts of 7½% and 12½%:

Lacquer I:                                Parts by weight
Phenolic, rosin-modified: 7–12% phenol resin and rosin; phenol is bis phenol; phenol-aldehyde ratio 1:1; acid catalyst_____lbs__ 100
Dehydrated castor oil, body Z3_____gals__ 10
Mineral spirits: heat to 580° F. to dissolve, cool to 450° F., reduce, add .03% soluble drier, cobalt naphthenate, metal to oil_____gals__ 28
Lacquer reduced with mineral spirits for can coating consistency.

Lacquer II:                               Parts by weight
Maleic resin:
Softening point 138–150° C.; acid number 40–50; from 1-pimaric acid and maleic anhydride _____lbs__ 100
Dehydrated castor oil, body S–V_____gals__ 15
Soybean oil, body S–V_____gals__ 5
Mineral spirits_____gals__ 33
Cobalt naphthenate drier _____lb__ 1
Cook at 575° F. ¾ hour, check with soybean oil, cool to 450° F., add drier and reduce.

Lacquer III:                              Parts by weight
Rosin modified phenolic of lacquer I above _____lbs__ 25
WW rosin _____lbs__ 10
Ester gum _____lbs__ 65
Tung oil _____gal__ 20
Linseed oil body Z1_____gal__ 5
Mineral spirits _____gal__ 44
Manganese drier (0.02% Mn metal:oil); heat oils to 400° F., add phenolic, heat to 560° F., check with part of linseed, cool to 450° F., add drier and reduce.

Each of the above lacquers containing the can release agents in the amounts specified in this example are applied to metal stock by the procedure of Example 1 and show excellent can release properties.

The foregoing example illustrates a few of the many modifications of resin and oil in the lacquer. Can release agents and mixtures which have been disclosed in the application may be applied by methods and in the lacquers of Examples 1 and 11 to provide excellent containers for releasing the proteinaceous contents.

*Example 12*

TABLE I.—PERFORMANCE OF VARIOUS CAN RELEASE AGENTS

Uncoated cans similar to the 12-ounce tins used for the canning of chopped beef and luncheon meat were coated in the following manner with the releasing agents listed below. An excess of the powdered agent (100-mesh) was put into the can, a lid was applied, and the can and content shaken vigorously for ca. one-half minute. The excess powder was then shaken out and the can inverted and tapped lightly until no more powder was released from the sides and bottom. The cans were then inverted on paper towels and put into a 145° C. oven for 15 minutes in order to melt and fuse the powdered agents. The cans were weighed before the coating was applied and after the heating period to obtain the weight of coating used for each. They were then filled with chopped beef, sealed and processed by the usual plant procedure. The opening and inspection were conducted and the results are tabulated below.

| Can Release Agent | M. P., °F. | Can No. | Grams of Coating Employed | Grams of Coating per 100 sq. cms. |
|---|---|---|---|---|
| Methylene-bis-amides from hydrogenated tallow amides | 257–264 | 1 | .020 | .0073 |
| Do | 257–264 | 2 | .013 | .0047 |
| Do | 257–264 | 3 | .019 | .0069 |
| Do | 257–264 | 4 | .016 | .0058 |
| Do | 266–271 | 5 | .061 | .0023 |
| Do | 266–271 | 6 | .034 | .0124 |
| N,N' distearoyl ethylenediamine | 284–287 | 7 | .016 | .0058 |
| Do | 284–287 | 8 | .023 | .0084 |
| Blank—no coating chopped beef | | 9 | | |
| Blank—no coating luncheon meat | | 10 | | |
| N-lauroyl hydrogenated tallow amides | 190–194 | 11 | .049 | .0179 |
| N-methylol hydrogenated tallow amides | 224–230 | 12 | .063 | .0230 |
| Methylene bis amides from hydrogenated tallow amides | 257–264 | 13 | .076 | .0277 |
| Ethylene-bis amides from hydrogenated tallow amides | 280–284 | 14 | .032 | .0117 |
| C-18 disubstituted amides from stearic acid | 171–174 | 15 | .052 | .0189 |
| C-18 monosubstituted amides from stearic acid | 178–183 | 16 | .030 | .0109 |
| Ethylene-bis amides from hydrogenated tallow amides | 268–276 | 17 | .032 | .0117 |
| Do | 255–271 | 18 | .048 | .0175 |

Results:

All the cans except 1, 2, 4, 9, and 10 released the meat easily and without any adherence to the sides or bottom. Cans 1 and 4 had only a very slight meat adhesion to the bottom but none on the sides and are satisfactory. Can 2 had moderate meat adherence on the bottom and none on the sides. Cans 9 and 10 contained no coating and had a considerable amount of adherence on both the sides and bottom. The product adherence in cans 1, 2 and 4 above is due to the low levels of the release agent used. By increasing the amount, satisfactory release was obtained.

TABLE II.—BOTTOM AND SIDE ADHESION TESTS

Preparation:

Cans (12 oz. uncoated TRYIT) 1 through 9 and 11 through 17, 19, 28, 30, 31 and 33 were coated with powdered agents. Cans 18, 20, 21 and 34 were coated with a turpentine suspension of the agents. Cans 22 and 23 were coated by spreading an excess of the liquid agents on the surface and allowing to drain. Can 24 was coated with a petroleum ether suspension and cans 25, 26 and 29 with a hot benzene solution-suspension. Can 32 was coated with a warm alcohol solution of the agent. All the coated cans were then heated in a 150° C. oven for 20 minutes. It was necessary to heat cans 17, 16, 26, 20, 5, 11 and 21 over a hot plate in order to melt and fuse the agents. The coated cans were then filled with chopped beef, sealed, and processed by the usual plant procedure, and inspected.

All of the compounds tested except those derived from ethylenediamine and low molecular weight fatty acids ($C_4$ and under) exhibited good releasing qualities. As the higher molecular weight ethylene bis-amides are satisfactory as release agents, it appears that the above failure is due to the characteristics caused by the short chain fatty acids employed. These compounds are somewhat crystalline in nature and not waxy. The acetyl-stearoyl ethylenediamine provides a satisfactory coating.

Results:

The results are grouped for convenience into the various types of derivatives examined.

| Coating Compound | M. P., ° F. | Can No. | Grams of wax on can | Amount of Adhesion on Sides | Bottom |
|---|---|---|---|---|---|
| Derivatives of Amides: | | | | | |
| Stearamide | 222-228 | 4 | .0923 | None | None. |
| Benzyl stearylamide | 163-167 | 5 | .0717 | ...do | Do. |
| Stearanilide | 152-163 | 14 | .0501 | ...do | Slight. |
| Do | 152-163 | 28 | .0764 | ...do | None. |
| Acetyl stearoyl hydroxyethyldiamide | 168-172 | 16 | .0644 | ...do | Do. |
| Derivatives of Ethylenediamine: | | | | | |
| N,N' Diformylethylenediamine | 217-227 | 18 | .1259 | Slight | Much. |
| Do | 217-227 | 34 | .1125 | Moderate | Moderate. |
| Diacetylethylenediamine | 329-342 | 21 | .0612 | Much | Much. |
| Do | 329-342 | 32 | .0707 | Moderate | Moderate. |
| Dibutyroyl ethylenediamine | 339 | 20 | .0135 | Much | Much. |
| Do | 339 | 30 | .0461 | Slight | Moderate. |
| Acetyl-stearoyl ethylenediamine 1.9 to 0.1 mol | 309-318 | 11 | .0401 | ...do | None. |
| Do | 309-318 | 29 | .0139 | None | Slight. |
| N,N' Stearoyl hydroxyethyl ethylenediamine | 156-157 | 12 | .0429 | ...do | None. |
| N,N' dioleoyl ethylenediamine | 210-228 | 24 | .0505 | ...do | Do. |
| Diacetyldistearoyl tetracarbonyl ethylendiamine | 228-232 | 7 | .0562 | ...do | Do. |
| Derivatives of Propylene and Butylenediamine: | | | | | |
| N,N' distearoyl propylenediamine | 230-235 | 3 | .0450 | ...do | Do. |
| Distearoyl butylene bisamide | 207-215 | 15 | .0928 | ...do | Do. |
| Derivatives of Triethylene tetramine: | | | | | |
| N,N' distearoyl triethylene tetramine | 236-239 | 13 | .0460 | ...do | Do. |
| Derivatives of tetraethylenepentamine: | | | | | |
| Dicaproyl tetraethylene pentamine | liquid below 77° F. | 23 | .4127 | ...do [1] | Do.[1] |
| N,N' distearoyl tetraethylenepentamine | 163-184 | 6 | .0422 | ...do | Do. |
| Bis N,N' distearoyl tetraethylenepentamine pentamethylene. | 142-144 | 1 | .0396 | ...do | Do. |
| Cycloimidines: | | | | | |
| Stearyl acetyl cycloimidine of ethylenediamine (.25 mol stearic acid, .75 mol acetic acid). | 284 | 25 | .0209 | ...do | Do. |
| Stearyl capryl cycloimidine of ethylenediamine (.9 mol stearic acid, .1 mol capric acid). | 274-282 | 2 | .0176 | ...do | Slight. |
| Stearyl capryl cycloimidine of ethylenediamine (.9 mol stearic acid, .1 mol capric acid). | 274-282 | 33 | .1277 | ...do | None. |
| Mixed $C_2$-$C_{10}$ cycloimidine (.1 mol acetic acid, .9 mol capric acid). | 304-306 | 26 | .0309 | ...do | Do. |
| $C_2$-$C_{11}$ cycloimidine (.5 mol acetic acid, .5 mol stearic acid) | 275-286 | 9 | .0714 | ...do | Do. |
| Decyl cycloimidine | 311-315 | 17 | .0826 | ...do | Do. |
| Bis-stearoyl cycloimidine of triethylene tetramine trimethylene. | 207-214 | 8 | .0520 | ...do | Do. |
| Stearoyl cycloimidine of triethylene tetramine | 173-221 | 22 | .0460 | ...do | Do. |
| Oleyl cycloimidine of tetraethylene pentamine | Liquid | 19 | .3616 | ...do [1] | Do.[1] |

[1] The dark viscous liquid agents here adhered to the meat and softened the enamel in the bottoms of the cans.

TABLE III.—PERFORMANCE OF N,N' DISTEAROYL ETHYLENEDIAMINE AT VARIOUS LEVELS AS A CAN RELEASE AGENT

Method of coating:

Cans (12 oz. uncoated TRYIT) 1 to 4, 6 and 7 were coated with a fine spray of a .05% solution of N,N' distearoyl ethylenediamine (100-mesh) in hot toluene (60° C.). The excess, if any, was allowed to drain from the cans while they were drying in an inverted position on a wire rack over the steam plate. The weight of wax applied to the can was approximately controlled by the length of spray time. Cans A through E were coated by filling with a solution-suspension of N,N' distearoyl ethylenediamine (100-mesh) in turpentine at room temperature, quickly emptying the contents, allowing the can to drain on paper towels and then dry on a wire rack over the steam plate. The level of wax applied was approximately controlled by the concentration of the wax in the turpentine. A .03% solution was used for cans B and F, a .10% for can C, a .15% for can D and a .30% for can E. This latter method of coating was the most satisfactory, resulting in an even coating of wax, somewhat spotty in appearance after melting.

All the cans, after drying over the steam plate, were placed in a 150° C. oven for 20 minutes to melt and fuse the wax. They were then filled with luncheon meat, sealed, and processed by the usual plant procedure. Inspection of the opened cans was then made.

Below are the observations on the amount of meat adhesion to the can for the various wax levels.

In connection with these results, it is to be noted that the method of coating and drying used tended to provide on the can bottom a lesser concentration of the coating per unit area than on the can sides.

Results:

| Can Code | Grams of wax on can | Grams of wax per 100 sq. cms. | Amount of Adhesion | |
|---|---|---|---|---|
| | | | On Sides | On Bottom |
| B | .0009 | .0003 | None | Much. |
| 4 | .0012 | .0004 | ...do | Do. |
| F | .0042 | .0015 | Slight | Do. |
| 2 | .0047 | .0017 | None | Do. |
| D | .0049 | .0018 | ...do | Do. |
| 3 | .0061 | .0022 | ...do | Do. |
| 1 | .0067 | .0024 | ...do | Do. |
| C | .0070 | .0026 | ...do | Moderate. |
| 7 | .0075 | .0027 | ...do | Slight on one side. |
| 6 | .0117 | .0043 | ...do | Do. |
| E | .0135 | .0049 | ...do | Very slight at one spot. |
| A | Blank | | Moderate | Much. |

Discussion:

The cans with less than .0026 gm. of wax per 100 sq. cms. were definitely unsatisfactory with respect to ease of meat release. .005 gm. per 100 sq. cms. seems to be approaching a satisfactory coating level. In a previous test .0073 and .0099 gm. of N,N' distearoyl ethylenediamine per 100 sq. cms. resulted in a satisfactory meat release with no adhesions. Thus, the minimum N,N' distearoyl ethylenediamine level for satisfactory releasing performance is between .0050 and .0073 gm. per 100 sq. cms. of surface area in contact with the meat.

*Example 13*

One mol of stearic acid, 280 parts, was reacted with one mol of diethylene triamine at 150–250° C. until 2 mols of water were driven off, to give a composition thought to be

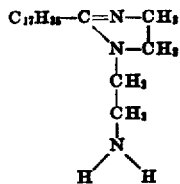

and subsequently reacted with an additional mol, 280 parts, stearic acid at temperatures of 200–250° C. until 1 mol of water was removed to give a structure thought to be

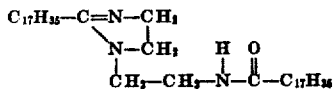

having both acyl amide and alkyl cycloimidine structures. This product was reacted with formaldehyde in ratio of 2 mols of 1 of p-formaldehyde at 150°–180° C., 1 mol of water was driven off to give the bridged product:

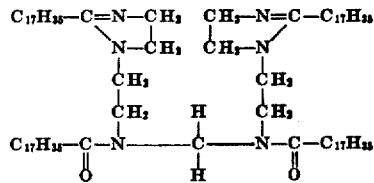

All these products are satisfactory can release agents.

Example 14

One mol of stearic acid, 280 parts, is reacted with one mol triethylene tetramine, 146 parts, at 200–250° C. until 2 mols, 36 parts, of water were removed, to form the cycloimidine.

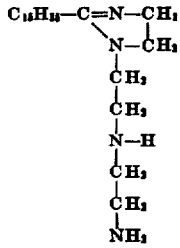

An additional mol, 280 parts, of stearic acid was added and the heating continued until an additional 18 parts, 1 mol, of water was lost, to give the product throught to be:

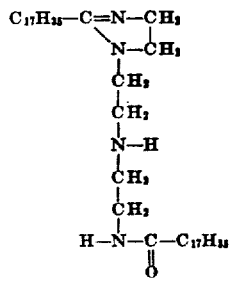

as in the preceding example. Two mols, 1104 parts, of this product were reacted with p-formaldehyde, two mols, 60 parts at 150–180° C. until 2 mols, 36 parts, of water were lost. The addition of more p-formaldehyde resulted in formaldehyde fumes and no gain in weight indicating the bridged structure:

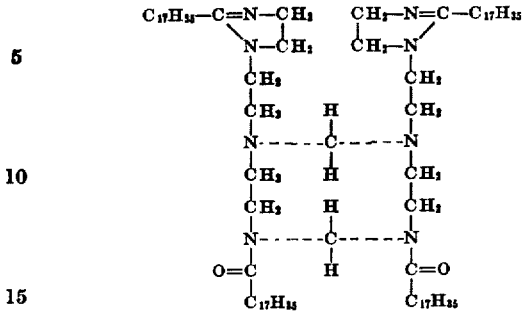

These products are satisfactory can release agents.

Our invention is not to be construed as limited to the methods of application described in the illustrative examples since other methods may be used, as will be evident to skilled workers in the art.

We claim:

1. In the method of preventing adhesion of food materials to the inner surfaces of containers in which said materials are to be cooked, the step comprising applying a waxy can release agent to said surfaces, said agent having a melting point above about 155° F. and being formed from the reaction of a carboxylic acid and a nitrogen base selected from the class consisting of ammonia and an amine with the evolution of water of condensation, and thereby forming an interface of a waxy character on said surfaces preferentially adherent thereto rather than to the contents of the can during food processing operation at temperatures above about 155° F.

2. A method as in claim 1 wherein the melting point of the waxy can release agent is above about 212° F., and the temperature of processing is above about 212° F.

3. The process of preventing the adhesion of food material to the interior surfaces of a container in which the food material is cooked, which comprises applying to such surfaces, prior to cooking the said material in said container, a coating of a can-releasing composition consisting essentially of a solid synthetic material having a melting point above about 155° F., said synthetic material being a nitrogen-containing product obtained from the reaction of a carboxylic acid and a nitrogen base selected from the class consisting of ammonia and an amine with the evolution of water of condensation, and cooking the said material in said container while the same is in contact with said coating.

4. The process of preventing the adhesion of food material to the interior surfaces of a container in which the food material is cooked, which comprises applying to such surfaces, prior to cooking the said material in said container, a coating of a can-releasing composition consisting essentially of a solid synthetic material having a melting point above about 155° F., said synthetic material being a nitrogen-containing aldehyde reaction product obtained by reacting a carboxylic acid and an amine with the evolution of water of condensation to produce a first product followed by reaction with a lower aliphatic aldehyde which bridges two molecules of said first product to produce an alkylene-bridged product constituting said nitrogen-containing aldehyde reaction product, and cooking the said material in said container while the same is in contact with said coating.

5. The process of preventing the adhesion of food material to the interior surfaces of a container in which the food material is cooked, which comprises applying to such surfaces, prior to cooking the said material in said container, a coating of a composition consisting essentially of a condensation product of a fatty acid amide containing from 10 to 26 carbon atoms in the molecule and an aldehyde, and cooking the said material in said container while the same is in contact with said coating.

6. The process of preventing the adhesion of food material to the interior surfaces of a container in which the food material is cooked, which comprises applying to such surfaces, prior to cooking the said material in said container, a coating of a composition consisting essentially of condensation product of stearamide and an aldehyde, and cooking the said material in said container while the same is in contact with said coating.

7. The process of preventing the adhesion of food material to the interior surfaces of a container in which the food material is cooked, which comprises applying to such surfaces, prior to cooking the said material in said container, a coating of a composition consisting essentially of condensation product of stearamide and formaldehyde, and cooking the said material in said container while the same is in contact with said coating.

8. The process of preventing the adhesion of food material to the inner surfaces of a container in which the food material is cooked, which comprises applying to such surfaces prior to cooking the said material in said container, a coating comprising a compound of the class consisting of (1) nitrogen-containing compounds having at least one N-acyl group

wherein the acyl radical contains at least 10 carbon atoms and (2) cycloimidine compounds having therein the group

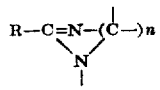

in which $n$ is a whole number greater than 1 and R is an alkyl radical having at least 9 carbon atoms, said compound having a melting point above about 155° F., and cooking the said material in said container while the same is in contact with said coating.

9. The process of preventing the adhesion of food material to the inner surfaces of a container in which the food material is cooked, which comprises applying to such surfaces prior to cooking the said material in said container, a coating comprising a waxy compound of the class consisting of (1) nitrogen-containing compounds having at least one N-acyl group

wherein the acyl radical contains at least 5 carbon atoms and (2) cycloimidine compounds having therein the group

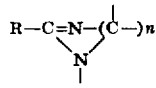

in which $n$ is a whole number greater than 1 and R is an alkyl radical having at least 9 carbon atoms, said compound having a melting point above about 155° F., and cooking the said material in said container while the same is in contact with said coating.

10. The process of preventing the adhesion of food material to the inner surfaces of a container in which the food material is cooked, which comprises applying to such surfaces prior to cooking the said material in said container, a coating comprising a waxy compound of the class consisting of (1) nitrogen-containing compounds having at least one N-acyl group

and (2) cycloimidine compounds having therein the group

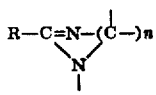

in which $n$ is a whole number greater than 1 and R is an alkyl radical, and cooking the said material in said container while the same is in contact with said coating.

11. The process of preventing the adhesion of food material to the inner surfaces of a container in which the food material is cooked, which comprises applying to such surfaces prior to cooking the said material in said container, a coating comprising a waxy compound of the class consisting of (1) nitrogen-containing compounds having at least one N-acyl group

wherein the acyl radical contains at least 10 carbon atoms and (2) cycloimidine compounds having therein the group

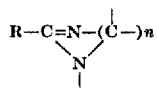

in which $n$ is a whole number greater than 1 and R is an alkyl radical having at least 9 carbon atoms, and cooking the said material in said container while the same is in contact with said coating.

12. The process of preventing the adhesion of food material to the inner surfaces of a container in which the food material is cooked, which comprises applying to such surfaces prior to cooking the said material in said container, a coating comprising a waxy compound of the class consisting of (1) nitrogen-containing compounds having at least one N-acyl group

wherein the acyl radical contains at least 5 carbon atoms and (2) cycloimidine compounds having therein the group

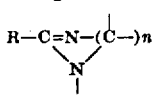

in which $n$ is a whole number greater than 1 and R is an alkyl radical having at least 9 carbon atoms, and cooking the said material in said container while the same is in contact with said coating.

13. The process of preventing the adhesion of food material to the inner surfaces of a container in which the food material is cooked, which comprises applying to such surfaces prior to cooking the said material in said container, a coating comprising an alkyl amide containing the

group which has attached thereto at least one alkyl radical having at least 9 carbon atoms, and cooking the said material in said container while the same is in contact with said coating.

14. The process of claim 13 wherein the alkyl amide is stearamide.

15. The process of preventing the adhesion of food material to the inner surfaces of a container in which the food material is cooked, which comprises applying to such surfaces prior to cooking the said material in said container, a coating comprising a diacyl amide containing the group

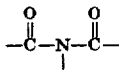

which has attached thereto at least one alkyl radical having at least 9 carbon atoms, and cooking the said material in said container while the same is in contact with said coating.

16. The process of claim 15 wherein the diacyl amide is distearoyl amide.

17. The process of preventing the adhesion of food material to the inner surfaces of a container in which the food material is cooked, which comprises applying to such surfaces prior to cooking the said material in said container, a coating comprising a bisamide containing the group

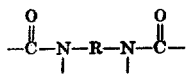

wherein at least one of the acyl radicals contains an alkyl group having at least 9 carbon atoms and wherein R is a radical of the group consisting of alkylene, amino-polyalkylene and polyamino-polyalkylene, and cooking the said material in said container while the same is in contact with said coating.

18. The process of claim 17 wherein the bisamide is ethylene bis-stearamide.

19. The process of preventing the adhesion of food material to the inner surfaces of a container in which the food material is cooked, which comprises applying to such surfaces prior to cooking the said material in said container, a coating comprising an alkane amide containing the group

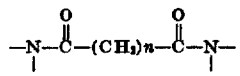

wherein $n$ is a whole number and wherein said group has attached thereto at least one alkyl radical having at least 9 carbon atoms, and cooking the said material in said container while the same is in contact with said coating.

20. The process of claim 19 wherein the alkane amide is N,N,N',N' tetraoctadecyl sebacamide.

21. The process of preventing the adhesion of food material to the inner surfaces of a container in which the food material is cooked, which comprises applying to such surfaces prior to cooking the said material in said container, a coating comprising an alkylarylamide having at least 10 carbon atoms in the alkyl radical, and cooking the said material in said container while the same is in contact with said coating.

22. The process of claim 21 wherein the alkylarylamide is stearanilide.

23. In the method of preventing adhesion of food materials to the inner surfaces of containers in which said materials are to be cooked, the step comprising applying a can release coating in said surfaces, said coating comprising a compound of the class consisting of (1) nitrogen-containing compounds having at least one N-acyl group

wherein the acyl radical contains at least 10 carbon atoms and (2) cycloimidine compounds having therein the group

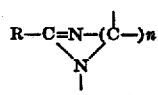

in which $n$ is a whole number greater than 1 and R is an alkyl radical having at least 9 carbon atoms, having a melting point above about 155° F.

24. In the method of preventing adhesion of food materials to the inner surfaces of containers in which said materials are to be cooked, the step comprising applying a waxy can release coating to said surfaces, said coating comprising a compound of the class consisting of (1) nitrogen-containing compounds having at least one N-acyl group

wherein the acyl radical contains at least 5 carbon atoms and (2) cycloimidine compounds having therein the group

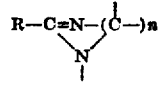

in which $n$ is a whole number greater than 1 and R is an alkyl radical having at least 9 carbon atoms, having a melting point above about 155° F.

25. In the method of preventing adhesion of food materials to the inner surfaces of containers in which said materials are to be cooked, the step comprising applying a waxy can release coating to said surfaces, said coating comprising a compound of the class consisting of (1) nitrogen-containing compounds having at least one N-acyl group

and (2) cycloimidine compounds having therein the group

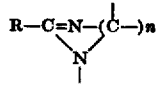

in which $n$ is a whole number greater than 1 and R is an alkyl radical, having a melting point above about 155° F.

26. In the method of preventing adhesion of food materials to the inner surfaces of containers in which said materials are to be cooked, the step comprising applying a waxy can release coating to said surfaces, said coating comprising a compound of the class consisting of (1) nitrogen-containing compounds having at least one N-acyl group

and (2) cycloimidine compounds having therein the group

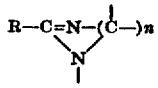

in which $n$ is a whole number greater than 1 and R is an alkyl radical.

27. In the method of preventing adhesion of food materials to the inner surfaces of containers in which said materials are to be cooked, the step comprising applying a waxy can release coating to said surfaces, said coating comprising a compound of the class consisting of (1) nitrogen-containing compounds having at least one N-acyl group

wherein the acyl radical contains at least 10 carbon atoms and (2) cycloimidine compounds having therein the group

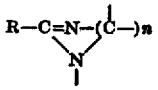

in which $n$ is a whole number greater than 1 and R is an alkyl radical having at least 9 carbon atoms.

28. In the method of preventing adhesion of food materials to the inner surfaces of containers in which said materials are to be cooked, the step comprising applying a waxy can release coating to said surfaces, said coating comprising an alkyl amide containing the group

which has attached thereto at least one alkyl radical having at least 9 carbon atoms.

29. In the method of preventing adhesion of food materials to the inner surfaces of containers in which said materials are to be cooked, the step comprising applying a waxy can release coating to said surfaces, said coating comprising a diacyl amide containing the group

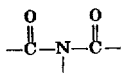

which has attached thereto at least one alkyl radical having at least 9 carbon atoms.

30. In the method of preventing adhesion of food materials to the inner surfaces of containers in which said materials are to be cooked, the step comprising applying a waxy can release coating to said surfaces, said coating comprising a bisamide containing the group

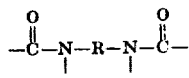

wherein at least one of the acyl radicals contains an alkyl group having 9 carbon atoms and wherein R is a radical of the group consisting of alkylene, amino-polyalkylene and polyamino-polyalkylene.

31. The method of claim 30 wherein the bisamide is ethylene bis-stearamide.

32. In the method of preventing adhesion of food materials to the inner surfaces of containers in which said materials are to be cooked, the step comprising applying a waxy can release coating to said surfaces, said coating comprising an alkane amide containing the group

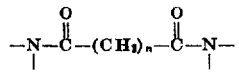

wherein $n$ is a whole number and wherein said group has attached thereto at least one alkyl radical having at least 9 carbon atoms.

33. In the method of preventing adhesion of food materials to the inner surfaces of containers in which said materials are to be cooked, the step comprising applying a waxy can release coating to said surfaces, said coating comprising an alkylarylamide having at least 10 carbon atoms in the alkyl radical.

References Cited in the file of this patent

UNITED STATES PATENTS

| | | |
|---|---|---|
| 2,098,538 | Charch et al. | Nov. 9, 1937 |
| 2,124,823 | Kronquest | July 26, 1938 |
| 2,185,031 | MacLaren et al. | Dec. 26, 1939 |
| 2,380,043 | Hochwalt | July 10, 1945 |
| 2,393,202 | Stegemeyer | Jan. 15, 1946 |
| 2,413,093 | Warth et al. | Dec. 24, 1946 |
| 2,647,125 | Gunderson | July 28, 1953 |

UNITED STATES PATENT OFFICE

Certificate of Correction

Patent No. 2,735,354                                                          February 21, 1956

Albert C. Edgar et al.

It is hereby certified that error appears in the printed specification of the above numbered patent requiring correction and that the said Letters Patent should read as corrected below.

Column 7, line 11, for "loing" read —long—; column 8, line 41, after "number" insert —from—; last line, for "time" read —type—; column 9, line 54, for "1.2" read —1,2—; column 13, line 70, for "to", first occurrence, read —at—; column 14, line 32, for "spirit" read —spirits—; column 21, line 24, for "of", first occurrence, read —to—; line 44, left-hand portion of the formula, for "$C_{15}H_{35}$" read —$C_{17}H_{35}$—.

Signed and sealed this 1st day of May 1956.

[SEAL]

Attest:
KARL H. AXLINE,
*Attesting Officer.*

ROBERT C. WATSON,
*Commissioner of Patents.*